(12) United States Patent
Kunze et al.

(10) Patent No.: US 11,342,593 B2
(45) Date of Patent: May 24, 2022

(54) ADDITIVE FOR ELECTROCHEMICAL ENERGY STORAGES AND ELECTROCHEMICAL ENERGY STORAGE

(71) Applicant: SCHOTT AG, Mainz (DE)

(72) Inventors: Miriam Kunze, Saulheim (DE); Ulrich Peuchert, Bodenheim (DE); Olaf Claussen, Undenheim (DE); Ulf Dahlmann, Gau-Odernheim (DE); Ralf Eiden, Mainz (DE); Sylvia Biedenbender, Bingen (DE); Andreas Roters, Mainz (DE); Gabriele Roemer-Scheuermann, Ingelheim (DE); Joerg Schuhmacher, Kornwestheim (DE)

(73) Assignee: SCHOTT AG, Mainz (DE)

( * ) Notice: Subject to any disclaimer, the term of this patent is extended or adjusted under 35 U.S.C. 154(b) by 869 days.

(21) Appl. No.: 14/603,791

(22) Filed: Jan. 23, 2015

(65) Prior Publication Data
US 2015/0207184 A1  Jul. 23, 2015

Related U.S. Application Data

(63) Continuation of application No. PCT/EP2013/062049, filed on Jun. 11, 2013.

(30) Foreign Application Priority Data

Jul. 26, 2012 (DE) .................... 10 2012 213 175.2
Sep. 6, 2012 (DE) .................... 10 2012 215 824.3

(51) Int. Cl.
*H01M 10/42* (2006.01)
*C03C 3/076* (2006.01)
(Continued)

(52) U.S. Cl.
CPC ......... *H01M 10/4235* (2013.01); *C03C 3/062* (2013.01); *C03C 3/07* (2013.01);
(Continued)

(58) Field of Classification Search
CPC combination set(s) only.
See application file for complete search history.

(56) References Cited

U.S. PATENT DOCUMENTS 5,168,019 A * 12/1992 Sugeno ............. H01M 10/0567
429/231.95
7,655,358 B2   2/2010 Kweon et al.
(Continued)

FOREIGN PATENT DOCUMENTS

DE   102009056756 A1   6/2011
DE   102010048922      4/2012
(Continued)

OTHER PUBLICATIONS

Lara et al., "Sintering of glasses in the system RO—Al2O3—BaO—SiO2 (R=Ca, Mg, Zn) studied by hot-stage microscopy," Solid State Ionics 170 (2004) 201-208 (Year: 2004).*
(Continued)

*Primary Examiner* — Amanda J Barrow
(74) *Attorney, Agent, or Firm* — Ohlandt, Greeley, Ruggiero & Perle, L.L.P.

(57) ABSTRACT

An additive for electrochemical energy storages is disclosed, wherein the additive contains at least one silicon- and alkaline earth metal-containing compound V1 which in contact with a fluorine-containing compound V2 in the energy storage forms at least one compound V3 selected from the group consisting of silicon- and fluorine-containing, lithium-free compounds V3a, alkaline earth metal- and fluorine-containing, lithium-free compounds V3b, silicon-, alkaline earth metal- and fluorine-containing, lithium-free
(Continued)

compounds V3c and combinations thereof. Also disclosed is an electrochemical energy storage containing the additive.

6 Claims, 1 Drawing Sheet

(51) Int. Cl.
| | |
|---|---|
| C09K 15/02 | (2006.01) |
| C09D 1/00 | (2006.01) |
| H01M 10/052 | (2010.01) |
| H01M 10/0567 | (2010.01) |
| H01M 10/05 | (2010.01) |
| C03C 3/091 | (2006.01) |
| C03C 12/00 | (2006.01) |
| C03C 3/062 | (2006.01) |
| C03C 3/07 | (2006.01) |
| C03C 3/078 | (2006.01) |
| H01M 50/409 | (2021.01) |

(52) U.S. Cl.
CPC .............. *C03C 3/076* (2013.01); *C03C 3/078* (2013.01); *C03C 3/091* (2013.01); *C03C 12/00* (2013.01); *C09D 1/00* (2013.01); *C09K 15/02* (2013.01); *H01M 10/05* (2013.01); *H01M 10/052* (2013.01); *H01M 10/0567* (2013.01); *H01M 50/409* (2021.01); *H01M 2220/30* (2013.01); *H01M 2300/0025* (2013.01)

(56) References Cited

U.S. PATENT DOCUMENTS

| | | | | | |
|---|---|---|---|---|---|
| 2006/0063659 | A1* | 3/2006 | Xue | ........................... | C03C 8/24 |
| | | | | | 501/15 |
| 2006/0292446 | A1 | 12/2006 | Kweon et al. | | |
| 2009/0061282 | A1* | 3/2009 | Wu | ........................... | C03C 8/02 |
| | | | | | 429/469 |
| 2009/0130458 | A1* | 5/2009 | Weil | ........................ | C04B 35/01 |
| | | | | | 428/433 |
| 2009/0197135 | A1* | 8/2009 | Querel | ................ | H01M 8/0282 |
| | | | | | 429/460 |
| 2009/0318278 | A1* | 12/2009 | Mayumi | ................. | C03C 3/068 |
| | | | | | 501/32 |
| 2010/0248928 | A1* | 9/2010 | Berthereau | ............. | C03C 13/00 |
| | | | | | 501/32 |
| 2011/0312482 | A1* | 12/2011 | Goedeke | ................. | C03C 3/064 |
| | | | | | 501/15 |
| 2012/0149544 | A1* | 6/2012 | Nagai | ..................... | C03C 3/087 |
| | | | | | 501/67 |
| 2013/0136981 | A1* | 5/2013 | Peuchert | ............. | H01M 50/431 |
| | | | | | 429/188 |
| 2013/0316218 | A1 | 11/2013 | Dahlmann et al. | | |

FOREIGN PATENT DOCUMENTS

| | | | | | |
|---|---|---|---|---|---|
| DE | 102011114876 A1 | | 4/2013 | | |
| JP | 11-224676 | * | 8/1999 | ............. | H01M 6/16 |
| JP | H11224676 | | 8/1999 | | |
| JP | 2005011614 A | | 1/2005 | | |
| WO | WO 2010/099939 | * | 9/2010 | ............. | C03C 3/064 |
| WO | 2011124347 A1 | | 10/2011 | | |
| WO | 2012045514 A2 | | 4/2012 | | |
| WO | 2012045662 A2 | | 4/2012 | | |

OTHER PUBLICATIONS

Toropov et al., "The Diagram of State of the Ternary System BaO—Al2O3—SiO2," I. A. Russ Chem Bull (1954) vol. 3, pp. 647-655 accessed at https://doi.org/10.1007/BF01170102 (Year: 1954).*
Seward III et al., "Phase Separation in the System BaO—SiO2," J. American Ceramic Society, vol. 51, No. 5, pp. 278-285, May 1968 (Year: 1968).*
Myung, et al. "Improvement of cycling performance of $Li_{1-1}Mn_{1.9}O_4$ at 60° C. by NiO addition for Li-ion secondary batteries" Elsevier Science Publishers, Barking GB, vol. 51, No. 26, Aug. 15, 2006, pp. 5912-5919.
Myung, et al. "Role of Alumina Coating on Li—Ni—Co—Mn—O Particles as Positive Electrode Material for Lithium-Ion Batteries" Chem. Mater. vol. 17 Jan. 1, 2005, pp. 3695-3704.
Park, et al. "Improvement of structural and electrochemical properties of $AlF_3$-coated $Li[Ni⅓Co⅓Mn⅓]O_2$ cathode materials on high voltage region" Journal of Power Sources, Elsevier SA, CH, vol. 178, No. 2, Mar. 3, 2008 pp. 826-831.
English translation of International Search Report dated Aug. 22, 2013 for corresponding International Application No. PCT/EP2013/062049.
Written Opinion of the International Searching Authority dated Aug. 22, 2013 for corresponding International Application No. PCT/EP2013/062049, 7 pages.
International Preliminary Report on Patentability dated Nov. 10, 2014 for corresponding International Application No. PCT/EP2013/062049 with English translation, 23 pages.
Lara et al., "Sintering of glasses in the system RO—Al₂O₃—BaO—SiO₂ (R=Ca, Mg, Zn) studied by hot-stage microscopy" Elsevier, Solid State Ionics 170, 2004, www.elsevier.com/locate/ssi, pp. 201-208.

* cited by examiner

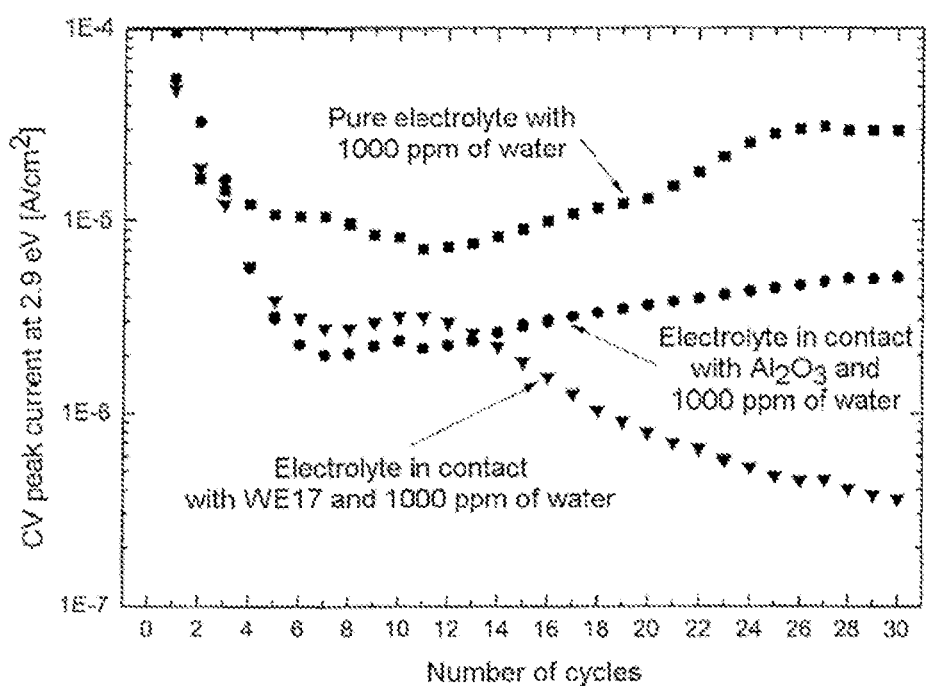

ADDITIVE FOR ELECTROCHEMICAL ENERGY STORAGES AND ELECTROCHEMICAL ENERGY STORAGE

CROSSREFERENCES TO RELATED APPLICATIONS

This application is a continuation of international patent application PCT/EP2013/062049, filed on Jun. 11, 2013 designating the U.S.A., which international patent application has been published in German language and claims priority from German patent application 10 2012 213 175.2, filed on Jul. 26, 2012, and 10 2012 215 824.3 filed on Sep. 6, 2012. The entire contents of these priority applications are incorporated herein by reference.

BACKGROUND OF THE INVENTION

The present invention encompasses an additive for electrochemical energy storages and an electrochemical energy storage.

Energy storages and additives containing, in particular, glass powder are known from, for example, the following documents: DE 10 2009 056 756 A1, WO 2011/124347 A1, WO 2012/045514 A2, WO 2012/045662 A2, DE 10 2011 114876.4, JP 2005-11614 A.

US 2006/0292446 A1 and U.S. Pat. No. 7,655,358 B2, respectively, describe a rechargeable lithium battery having a positive electrode which contains a lithium-containing transition metal compound as positive-active material and an additive. The additive comprises at least elemental Si, B, Ge, Ga, Mg, Ca, Sr, Ba or at least one oxide of these elements. According to these documents, the elements or the oxides of these elements react with HF which is undesirable in the battery. Thus, $SiO_2$ reacts with HF to form $H_2SiF_6$ and the alkaline earth metal oxides (RO) react with HF to form alkaline earth metal fluorides ($RF_2$).

Future energy storages, e.g. rechargeable lithium ion batteries for mobile or stationary applications, require improvement of the energy storages in respect of safety, cost and weight, the latter with a view to increasing the specific energy or power density.

The life of, in particular, energy storages containing lithium ions both in operation (charging and discharging processes) and during the general downtime (calendar life) also plays an important role. The effects which impair the life are, apart from many others, for example the increasing formation of a surface layer on the anode (solid electrolyte interface (SEI)) with the consequence of an increasing lithium deficiency and an increase in the internal resistance.

Furthermore, the degradation of energy storage materials or components by HF (hydrogen fluoride) formed is a significant life-impairing mechanism. The formation of HF depends, in particular, on the water content in the energy storage, with the water reacting with fluorine-containing electrolyte salts. Moisture (water) can get into the energy storage, in particular during production of the energy storage. However, moisture can also creep into the energy storage during operation due to very small leaks, e.g. in the region where the contact is passed through the polymer.

These and many other problems, in particular chemical and electro-chemical processes, are generally minimized by addition of additives, e.g. to the liquid electrolyte of an energy storage, e.g. a lithium ion cell (low-temperature additives, SEI formation enhancers or controllers, flame retardants, wetting agents, anion receptors, over charging prevention additives, water and acid scavengers, additives for smooth lithium deposition, etc.). The additives are virtually exclusively organic, aromatic or metal-organic compounds which often contain halogens or sulfur. These are therefore often toxic, also expensive and frequently highly flammable because of a lack of thermal stability.

A further disadvantage is the lack of flexibility of integration of the additives known hitherto into existing energy storages. In the case of a liquid component or of a solid which cannot be coated and dissolves immediately and completely in the electrolyte, it is not possible for the effect to be applied locally if required.

An example is the use of a processable solid-state functional additive for local protection of an HF— and water-sensitive cathode material such as $LiMn_2O_4$ (LMO) against HF and water. NiO or ZnO is added for this purpose. This can, if desired, be integrated into the composite by coating of the electrode particles or the entire electrode or by mixing into the cathode material.

SUMMARY OF THE INVENTION

In view of this, it is a first object of the invention to disclose an electro-chemical energy storage having an improved performance when compared with prior designs.

It is a second object of the invention is to disclose an additive for an electrochemical energy storage that improves the performance of the electrochemical energy storage.

It is a further object of the invention to disclose a thermally stable additive which is in particular not toxic for flexible use in all regions of a rechargeable lithium ion battery cell (LIB cell).

A further object of the invention is to disclose an additive having the functionality for binding (calendar and under potential load) of harmful fluorine-containing compounds in the energy storage, in particular HF, and/or water in an LIB cell.

A further object of the invention is to disclose an additive that does not adversely affect the cell chemistry of an LIB cell by release of surface water.

According to the invention these and other objects are solved by an additive for electrochemical energy storages, wherein the additive contains at least one silicon- and alkaline earth metal-containing compound V1 which in contact with a fluorine-containing compound V2 in the energy storage forms at least one compound V3 selected from the group consisting of silicon- and fluorine-containing, lithium-free compounds V3a, alkaline earth metal- and fluorine-containing, lithium-free compounds V3b, silicon-, alkaline earth metal- and fluorine-containing, lithium-free compounds V3c and combinations thereof.

Thus, in contact with a fluorine-containing compound V2 in the energy storage, at least one compound V3 is formed.

The compound V3 is, in particular, a nonvolatile, nongaseous compound which binds the fluorine present very well (under normal operating conditions of the energy storage).

Preferred embodiments of the additive of the invention are described below.

The compound V1 is preferably a powder, in particular a glass powder, which comprises at least the following constituents (in % by weight):

$SiO_2$ from >0 to <100, preferably from >40 to <70,
MO from >0 to <100, preferably from >30 to <60,
where M is selected from the group consisting of the alkaline earth metal elements.

The compound V1 is preferably a glass powder, in particular a glass powder containing at least one alkaline earth metal oxide and silicon dioxide as glass composition constituents.

The molar ratio of alkaline earth metal oxide to silicon dioxide is preferably in the range from 0.45 to ≤1.0, particularly preferably from 0.65 to ≤1.0.

The compound V1 is preferably a glass powder which has the following glass composition constituents (in % by weight):

| | |
|---|---|
| $SiO_2$ | 15-75 |
| $BaO$ | 0-80 |
| $ZrO_2$ | 0-15 |
| $Li_2O$ | 0-25 |
| $P_2O_5$ | 0-20 |
| $Al_2O_3$ | 0-10 |
| $CaO$ | 0-30 |
| $MgO$ | 0-30 |
| $MgO + BaO + CaO$ | ≥20 |
| $NiO$ | 0-10 |
| $PbO$ | 0-10 |
| $ZnO$ | 0-10 |
| $F$ | 0-5 |

The compound V1 is preferably a glass powder which has the following glass composition constituents (in % by weight):

| | |
|---|---|
| $SiO_2$ | 15-45 |
| $BaO$ | 10-80 |
| $ZrO_2$ | 0-15 |
| $Li_2O$ | 0-25 |
| $P_2O_5$ | 0-20 |
| $Al_2O_3$ | 0-10 |
| $CaO$ | 0-30 |
| $MgO$ | 0-30 |
| $MgO + BaO + CaO$ | ≥30 |
| $NiO$ | 0-10 |
| $PbO$ | 0-10 |
| $ZnO$ | 0-10 |
| $F$ | 0-5 |

The compound V1 is preferably a glass powder which has the following glass composition constituents (in % by weight):

| | |
|---|---|
| $SiO_2$ | 20-40 |
| $BaO$ | 40-80 |
| $ZrO_2$ | 0-8 |
| $Li_2O$ | 0-15 |
| $P_2O_5$ | 0-15 |
| $Al_2O_3$ | 0-10 |
| $CaO$ | 0-30 |
| $MgO$ | 0-30 |
| $MgO + BaO + CaO$ | ≥30 |
| $NiO$ | 0-10 |
| $PbO$ | 0-10 |
| $ZnO$ | 0-10 |
| $F$ | 0-5 |

The compound V3a or the compound V3c preferably contains $[SiF_6]^{2-}$ groups.

The compound V3b or the compound V3c preferably contains $MSiF_6$, where M is at least one alkaline earth metal element, in particular barium.

The compound V3b or the compound V3c preferably contains $MF_2$, where M is at least one alkaline earth metal element, in particular barium.

The compound V3 is preferably formed on the surface of the compound V1.

The additive is preferably a constituent of an electrode, an electrolyte or a separator of an energy storage.

The additive preferably contains at least one silicon- and alkaline earth metal-containing compound V1 which in contact with HF in the energy storage forms at least the compound V3.

Furthermore, the object is achieved by an electrochemical energy storage which contains an additive as mentioned above; i.e., in particular, by an additive for electrochemical energy storages, wherein the additive contains at least one silicon- and alkaline earth metal-containing compound V1 which in contact with a fluorine-containing compound V2 in the energy storage forms at least one compound V3 selected from the group consisting of silicon- and fluorine-containing, lithium-free compounds V3a, alkaline earth metal- and fluorine-containing, lithium-free compounds V3b, silicon-, alkaline earth metal- and fluorine-containing, lithium-free compounds V3c and combinations thereof.

Preferred embodiments of the energy storage are described below.

In contact with an electrolyte of the energy storage, the additive preferably has at least one of the following three properties:
better binding of HF,
better binding of $H_2O$,
lower release of $H_2O$,
compared to an $Al_2O_3$ powder in contact with the electrolyte, at the same average particle size of $Al_2O_3$ powder and a powder composed of the additive powder. The electrochemical energy storage preferably contains a glass powder which has all three properties.

The better binding of HF, the better binding of $H_2O$ or the lower release of $H_2O$ can preferably be observed qualitatively by means of cyclovoltammetry.

Thus, the HF property and preferably additional $H_2O$ properties of a glass powder are compared with the corresponding properties of an $Al_2O_3$ powder, with the two powders having a comparable average particle size and the three properties being determined under comparable conditions. The better binding of HF and the better binding of $H_2O$ are presumably based on better chemical binding of these materials by the suitable glass powder than by the comparable $Al_2O_3$ powder. The lower release of $H_2O$ is presumably based on better adsorption of $H_2O$ in the liquid electrolyte by the glass powder than by the comparable $Al_2O_3$ powder.

At least one of the three properties of the additive preferably improves as a function of time, in particular over a period of up to 2 to 5 days, by contact of the additive, in particular the glass powder, with the electrolyte. That is to say, for example, the better binding of HF over the course of time starting from manufacture of the energy storage gradually improves, i.e. less HF is initially bound and then more is bound over the course of time.

The electrolyte is preferably a nonaqueous electrolyte, an electrolyte based on carbonate solvents and/or the electrolyte preferably contains at least $LiPF_6$ as an electrolyte salt.

The energy storage is preferably a lithium ion cell.

The energy storage preferably contains an anode, a cathode and a separator. It has surprisingly been found that significantly better electrochemical energy storages are obtained by means of these simple measures.

For the purposes of the invention, the term electrochemical energy storage encompasses primary and secondary batteries, rechargeable batteries, lithium ion cells, lithium metal cells and capacitors. Preference is given to rechargeable lithium ion cells.

For the purposes of the invention, the term glass powder encompasses glass powders and/or glass-ceramic powders.

The term fluorine-containing compound V2 encompasses HF.

For the purposes of the invention, the term HF encompasses HF, fluorine and fluoride ions.

For the purposes of the invention, the term lithium-free compound means that the compound is free of lithium except for unavoidable traces; the lithium-free compound preferably does not contain any lithium. The ultimate objective is to immobilize virtually no lithium of the energy storage in the compound V3.

In a preferred electrochemical energy storage, the glass powder forms, in contact with the electrolyte, an Si—F compound which is sparingly soluble in the electrolyte and thus binds HF better.

In a further preferred electrochemical energy storage, the glass powder contains $SiO_2$ and at least one alkaline earth metal oxide of the general formula MO, where M=Mg, Ca, Ba, Sr as glass composition constituent and in contact with the electrolyte forms an Si—F compound of the general formula $MSiF_6$, preferably $BaSiF_6$, which is sparingly soluble in the electrolyte and thus binds HF better. Mixed crystal phases having more than one alkaline earth metal ion also perform the intended function and can be used.

The formation of the sparingly soluble fluoride does not necessarily but preferably occur on the surface of the glass powder particles. As an alternative, the formation of very fine colloids of the sparingly soluble fluoride phase in the electrolyte is also conceivable.

The better binding of HF in the electrochemical energy storage can, as a conceivable possibility, be explained as follows:

The glass powder is, in the production process, deliberately made in such a way that the alkaline earth metal ions, preferably barium ions, which are particularly important for the getter effect are present in an increased concentration at the surface of the glass particles and in contact with the electrolyte go from the surface of the glass particles into the electrolyte and can react here to form a sparingly soluble fluorine-containing compound. In these reactions, water is consumed and is thus not available for forming further HF in the system, which likewise has a positive effect on the life of the energy storage.

As a result of the alkaline earth metal ions being present in an increased concentration at the surface of the glass particles they are also able to bind water and thus additionally withdraw it from the system. In the ideal case, the formation of HF via the reaction of the electrolyte salt with water can be completely prevented in this way. The electrochemical energy storage is preferably a rechargeable lithium ion cell.

In a further preferred electrochemical energy storage, the glass powder is part of a separator of the energy storage, in particular a filler, and/or a coating of a separator and/or part of an electrode of the energy storage, in particular of the anode, and the glass powder is preferably integrated into the electrode or applied to the surface thereof.

In a preferred electrochemical energy storage, the glass powder is present in the electrolyte of the energy storage, in particular in a solid electrolyte and/or a liquid electrolyte.

The invention preferably also provides for the use of a functional, vitreous or glass-producing or ceramic pulverulent additive as constituent of a lithium ion cell. The constituent preferably binds damaging fluoride chemically. Furthermore, water is chemically bound and the formation of HF is also suppressed. The binding of HF and water takes place during downtimes and also under potential load. The release of surface water from the additive is additionally minimal.

The electrochemical energy storage particularly preferably contains a glass powder which has the following composition ranges (in % by weight).

Composition range 1:

| | |
|---|---|
| $SiO_2$ | 15-75 |
| BaO | 0-80 |
| $ZrO_2$ | 0-15 |
| $Li_2O$ | 0-25 |
| $P_2O_5$ | 0-15 |
| $Al_2O_3$ | 0-10 |
| CaO | 0-30 |
| MgO | 0-30 |
| MgO + BaO + CaO | ≥20 |
| NiO | 0-10 |
| PbO | 0-10 |
| ZnO | 0-10 |
| F | 0-5 |

Composition range 2:

| | |
|---|---|
| $SiO_2$ | 15-45 |
| BaO | 10-80 |
| $ZrO_2$ | 0-15 |
| $Li_2O$ | 0-25 |
| $P_2O_5$ | 0-20 |
| $Al_2O_3$ | 0-10 |
| CaO | 0-30 |
| MgO | 0-30 |
| MgO + BaO + CaO | ≥30 |
| NiO | 0-10 |
| PbO | 0-10 |
| ZnO | 0-10 |
| F | 0-5 |

Composition range 3:

| | |
|---|---|
| $SiO_2$ | 15-45 |
| BaO | 10-80 |
| $ZrO_2$ | 0-15 |
| $Li_2O$ | 0-25 |
| $P_2O_5$ | 0-20 |
| $Al_2O_3$ | 0-10 |
| CaO | 0-30 |
| MgO | 0-30 |
| MgO + BaO + CaO | ≥40 |
| NiO | 0-10 |
| PbO | 0-10 |
| ZnO | 0-10 |
| F | 0-5 |

Composition range 4:

| | |
|---|---|
| $SiO_2$ | 15-45 |
| BaO | 50-80 |
| $ZrO_2$ | 0-15 |
| $Li_2O$ | 0-25 |
| $P_2O_5$ | 0-20 |
| $Al_2O_3$ | 0 10 |
| NiO | 0-10 |
| PbO | 0-10 |
| ZnO | 0-10 |
| F | 0-5 |

Composition range 5:

| | |
|---|---|
| SiO$_2$ | 15-45 |
| BaO | 50-80 |
| ZrO$_2$ | 0-15 |

In the case of all composition ranges 1 to 5, refining agents can be added in normal amounts up to 2% by weight.

As conventional refining agents, it is possible to use SnO$_2$, As$_2$O$_3$, Sb$_2$O$_3$, sulfur, CeO$_2$, etc. Particularly when polyvalent refining agents are indispensible, the proportion of these should, for reasons of electrochemical stability, be kept very small, ideally below 500 ppm. Refining agents may in principle be dispensed with entirely if the glass is produced in a form close to the application, i.e. as fine powder, and exacting requirements in respect of freedom from bubbles do not have to be met.

The following elements should, even if they cannot be leached into the electrolyte, be present in very small amounts of <1000 ppm, preferably <500 ppm, particularly preferably <150 ppm, in the glass powder: Fe, Ni, Cu, Bi.

Glass compositions which together with the electrolyte form SiF$_6$ compounds are critical. Accordingly, silicon is in principle necessary in the glass but should be well balanced with other glass components. In order to achieve the best possible fusibility combined with the lowest possible crystallization tendency and high glass homogeneity, an MO/SiO$_2$ ratio, particularly preferably a BaO/SiO$_2$ ratio, of from 0.65 to ≤1.0 should preferably be ensured. This is preferably combined with SiO$_2$ contents which are not too high, viz. <75% by weight, particularly preferably <50% by weight, very particularly preferably even <40% by weight. The addition of Li$_2$O and/or P$_2$O$_5$, for example, is advantageous for economical production.

The abovementioned SiF$_6$ compounds which are formed according to the invention are sparingly soluble alkaline earth metal hexafluorosilicates. Any formation of corresponding lithium salts, as described, for example, in JP 2005-011614 A, is undesirable for the purposes of the use, since in this way lithium is withdrawn from the system and can no longer be utilized for energy storage. In JP 2005-011614 A, lithium is deliberately immobilized in the case of abnormal cell behavior.

The present invention thus also provides a nontoxic, thermally stable inorganic additive (solid-state additive) for flexible use in all regions of an energy storage, e.g. a rechargeable lithium ion cell, in order to give it a longer life in use. In particular, the invention provides a functionality for binding harmful HF and water in an energy storage; these are the influencing factors in cell aging. Binding occurs in the energy storage when a potential is applied and also during downtimes. Furthermore, the added glass powder releases much less surface water compared to the other materials used in the energy storage.

The invention also encompasses:

1. Long-life, rechargeable lithium ion cells, characterized by a pulverulent, inorganic, solid, vitreous or glass-ceramic or ceramic additive constituent which exercises an active influence on the cell chemistry by a) reversible surface action and b) irreversible chemical action.

2. A rechargeable lithium ion cell characterized by a pulverulent, solid vitreous or glass-ceramic or ceramic additive constituent which chemically binds fluoride.

A rechargeable lithium ion cell characterized by a pulverulent, solid vitreous or glass-ceramic or ceramic additive constituent which (chemically) binds water.

A rechargeable lithium ion cell characterized by a pulverulent, solid vitreous or glass-ceramic or ceramic additive constituent which does not release surface water into the electrolyte.

3. An LIB cell in which the glass powder comprises barium oxide.

4. An LIB cell in which the glass powder scavenges free fluorine or HF under potential load and during downtimes.

5. An LIB cell in which the glass powder scavenges free H$_2$O under potential load and during downtimes.

6. An LIB cell in which the glass powder scavenges free fluorine or HF to form electrolyte-insoluble barium species.

7. An LIB cell in which the glass powder is integrated into the region of the separator or is a constituent of a separator.

8. An LIB cell in which the glass powder functions as filler or as a coating material of an infiltrated or ceramic-coated separator.

9. An LIB cell in which the glass powder is a constituent of a filler mixture.

10. An LIB cell in which the glass powder is a constituent of a filler mixture together with Al$_2$O$_3$, Al(OH)$_3$, SiO$_2$, ZrO$_2$, Mg(OH)$_2$, TiO$_2$, BaTiO$_3$ or another electrolyte-stable glass.

11. An LIB cell in which the glass powder is a constituent of a cathode composite (LCO, NMC, LFP and the like).

12. An LIB cell in which the glass powder is a constituent of an anode composite (C, Si, Sn and the like).

13. An LIB cell in which the glass powder is a constituent of a liquid electrolyte.

BRIEF DESCRIPTION OF THE DRAWINGS

The sole FIGURE is a graph that depicts a decrease in the HF concentration under potential load for both material a and material b.

PREFERRED EMBODIMENTS OF THE INVENTION

EXAMPLES

A glass powder as additive (working examples WE 1 to WE 25) is described in the following.

The glass powder was introduced into a battery electrolyte and allowed to stand at 60° C. for seven days. After separating off the electrolyte and drying the material, the BaSiF$_6$ formed (e.g. at the surface of the glass powder) can be confirmed by means of XRD (X-ray powder diffraction); as an alternative and in the case of formation of noncrystalline phases also by EDX and SEM.

Compositions in which $BaSiF_6$ was detected (table 1):
CE 1 Comparative example with 100% $Al_2O_3$
n.d. not determined

TABLE 1

| Composition [% by weight] | CE 1 | WE 1 | WE 2 | WE 3 | WE 4 | WE 5 |
|---|---|---|---|---|---|---|
| $SiO_2$ | | 55.0 | 29.0 | 26.3 | 31.6 | 36.2 |
| $ZrO_2$ | | | | 5.7 | 2.7 | 2.8 |
| $Al_2O_3$ | 100 | 10.0 | 1.0 | | | |
| $B_2O_3$ | | 10.0 | | | | |
| BaO | | 25.0 | 66.5 | 67.0 | 65.7 | 61.0 |
| ZnO | | | | | | |
| $Li_2O$ | | | 0.9 | | | |
| $P_2O_5$ | | | 2.7 | | | |
| F | | | | | | |
| PbO | | | | | 1.0 | |
| Ratio of $BaO/SiO_2$ (on a molar basis) | — | 0.18 | 0.9 | 1.0 | 0.81 | 0.66 |
| Main phase in the XRD analysis of the filter cake | — | n.d. | n.d. | $BaSiF_6$ | $BaSiF_6$ | $BaSiF_6$ |
| Glass transition temperature Tg [° C.] | — | 665 | 620 | 767 | 742 | 729 |

| Composition [% by weight] | WE 6 | WE 7 | WE 8 | WE 9 | WE 10 | WE 11 |
|---|---|---|---|---|---|---|
| $SiO_2$ | 28.3 | 29.0 | 27.1 | 28.2 | 27.2 | 27.2 |
| $ZrO_2$ | 6.1 | | | 6.1 | | |
| $Al_2O_3$ | | | 1.0 | | 1.0 | 1.0 |
| $B_2O_3$ | | | | | | |
| BaO | 64.6 | 62.4 | 63.1 | 63.7 | 65.2 | 61.8 |
| ZnO | | | | | | |
| $Li_2O$ | | 0.6 | 1.7 | | | 1.7 |
| $P_2O_5$ | | 8.0 | 8.1 | | 6.6 | 8.3 |
| F | 1.0 | | | 1.0 | | |
| PbO | | | | | | |
| Ratio of $BaO/SiO_2$ (on a molar basis) | 0.89 | 0.85 | 0.91 | 0.88 | 0.94 | 0.89 |
| Main phase in the XRD analysis of the filter cake | $BaSiF_6$ | $BaSiF_6$ | $BaSiF_6$ | $BaSiF_6$ | $BaSiF_6$ | $BaSiF_6$ |
| Glass transition temperature Tg [° C.] | 718 | 620 | 577 | 719 | 711 | 594 |

| Composition [% by weight] | WE 12 | WE 13 | WE 14 | WE 15 | WE 16 | WE 17 |
|---|---|---|---|---|---|---|
| $SiO_2$ | 29.5 | 28.6 | 29.2 | 29.0 | 28.9 | 26.6 |
| $ZrO_2$ | | | | | | 5.5 |
| $Al_2O_3$ | 1.0 | 1.0 | 1.0 | 1.1 | 1.0 | |
| $B_2O_3$ | | | | | | |
| BaO | 67.9 | 65.4 | 66.9 | 66.5 | 66.1 | 67.9 |
| ZnO | | | | | | |
| $Li_2O$ | 0.3 | 0.9 | 1.5 | 0.6 | 1.2 | |
| $P_2O_5$ | 1.3 | 4.1 | 1.4 | 2.8 | 2.8 | |
| F | | | | | | |
| PbO | | | | | | |
| Ratio of $BaO/SiO_2$ (on a molar basis) | 0.9 | 0.9 | 0.9 | 0.9 | 0.9 | 1.0 |
| Main phase in the XRD analysis of the filter cake | $BaSiF_6$ | $BaSiF_6$ | n.d. | $BaSiF_6$ | n.d. | $BaSiF_6$ |
| Glass transition temperature Tg [° C.] | n.d. | 627 | n.d. | 655 | 605 | 790 |

TABLE 1-continued

| Composition [% by weight] | WE 18 | WE 19 | WE 20 | WE 21 | WE 22 | WE 23 |
|---|---|---|---|---|---|---|
| $SiO_2$ | 29.9 | 28.2 | 30.2 | 27.6 | 28.5 | 28.8 |
| $ZrO_2$ | | | | | | 1.2 |
| $Al_2O_3$ | 1.0 | 1.0 | 1.0 | 1.0 | | |
| $B_2O_3$ | | | | | | |
| BaO | 65.7 | 67.5 | 66.8 | 66.0 | 65.3 | 66.2 |
| ZnO | | | | | | |
| $Li_2O$ | 0.6 | 0.6 | 0.6 | 0.6 | 0.9 | 0.9 |
| $P_2O_5$ | 2.8 | 2.7 | 1.4 | 4.9 | 4.1 | 4.1 |
| F | | | | | | |
| PbO | | | | | | |
| Ratio of $BaO/SiO_2$ (on a molar basis) | 0.86 | 0.94 | 0.86 | 0.94 | 0.9 | 0.9 |
| Main phase in the XRD analysis of the filter cake | n.d. | n.d. | n.d. | n.d. | n.d. | n.d. |
| Glass transition temperature Tg [° C.] | 651 | 635 | n.d. | 637 | n.d. | n.d. |

| Composition [% by weight] | WE 24 | WE 25 | WE 26 | WE 27 | WE 28 |
|---|---|---|---|---|---|
| $SiO_2$ | 28.2 | 28.3 | 45 | 63.6 | 63.6 |
| $ZrO_2$ | 1.2 | | | | |
| $Al_2O_3$ | 1.0 | 1.0 | | | |
| $B_2O_3$ | | | | | |
| BaO | 64.6 | 64.7 | 55 | | |
| ZnO | | | | | |
| $Li_2O$ | 0.8 | 0.9 | | | |
| $P_2O_5$ | 4.1 | 4.2 | | | |
| F | | 0.9 | | | |
| PbO | | | | | |
| MO | | | | CaO 36.4 | MgO 36.4 |
| Ratio of $MO/SiO_2$ (on a molar basis) | | | | 0.61 | 0.85 |
| Ratio of $BaO/SiO_2$ (on a molar basis) | 0.9 | 0.9 | 0.48 | | |
| Main phase in the XRD analysis of the filter cake | n.d. | n.d. | n.d. | n.d. | n.d. |
| Glass transition temperature Tg [° C.] | n.d. | n.d. | 685 | n.d. | n.d. |

The electrolyte used is essentially a mixture of one or more nonaqueous solvents, preferably carbonate solvents, and at least one fluoride-based electrolyte salt. $LiPF_6$ was preferably used as electrolyte salt.

Possible solvents are, for example:
propylene carbonate (PC), ethylene carbonate (EC), butylene carbonates (BC), dimethyl carbonate (DMC), diethyl carbonate (DEC), vinylene carbonate (VC), methyl ethyl carbonate (EMC), 1,2-dimethoxyethane (DME), 1,2-diethoxyethane (DEE), γ-butyrolactone (γ-BL), sulfolane, acetonitrile, N-methyl-2-pyrrolidone (NMP), dimethyl sulfoxide (DMSO), ethyl acetate (EA), 1,3-dioxolane (DOL), tetrahydrofuran (THF), tetra(ethylene glycol) dimethyl ether (TEGDME), tri(ethylene glycol) dimethyl (TEGD). Preference is in principle given to using PC, EC, γ-BL, DMC, DEC, EMC or DME.

The solvents can be used either alone or as suitable mixtures. Examples of mixtures are EC/DMC in a ratio of 50/50 (% by weight) or electrolyte mixtures having a ratio of EC to (DMC+EMC) of <1. $LiPF_6$ can be used either alone or in combination with other electrolyte salts. The latter encompass, by way of example, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $Li[(OCO)_2]_2B$, LiDFOB, LiCl, and LiBr.

The concentration of $LiPF_6$ or electrolyte salt mixtures in the nonaqueous solvents is not limited but should preferably remain within the following ranges: from 0.1 M ($mol/dm^3$) to 5.0 M, preferably from 0.5 M to 3.0 M.

The electrolyte consisting of solvent and electrolyte salt has, for example, the following composition:

1 mol of $LiPF_6$ in EC/DMC 1:1 (% by weight)

The invention is illustrated by the following working examples.

The glass powder WE 17 has the following composition in mol %:

| | |
|---|---|
| $SiO_2$: | 47.5 |
| BaO: | 47.5 |
| $ZrO_2$: | 5 |

Example 1

The inorganic material (a: $Al_2O_3$ BET surface area from 7 to 8 $m^2/g$, particle size D50, purity for batteries; b: WE17 BET surface area from 7 to 8 $m^2/g$, particle size D50, purity for batteries) introduces the same amount of surface water (2000-3000 ppm) into the system on integration into the LIB cell. Material b releases this to the smallest extent in the cell, in particular the electrolyte compared to the electrode materials. This can be seen from cyclovoltammetry (CV) results:

The respective material is dried and then introduced into the test cell consisting of two Pt electrodes as counterelectrode and working electrode which is uncoated.

In the cyclovoltammograms, the peak at 2.2 V indicates the existence of free water in the cell. This is not present in the case of materials a and b in the first cycle. During the further course of the experiment (cycles 5 and 10), a small water peak is detected in the case of material a and no water peak is detected in the case of material b.

Example 2

Materials a and b are admixed with a mixture of electrolyte and water in order to reinforce the formation of damaging HF and examined by means of cyclovoltammetry. The reference is an electrolyte (ethylene carbonate:dimethyl carbonate (1:1) containing 1 mol/l of $LiPF_6$) without addition of an inorganic material. The effect of the binding of HF is shown by evaluation of a peak characteristic of HF at 2.9 V in the cyclovoltammogram. The decrease in the HF concentration is apparent under potential load for both materials, viz. a and b, while in the system of electrolyte with water the amount of HF even increases toward the end of the experiment (see the sole FIGURE).

The cathode material $LiMn_2O_4$ (LMO) was additionally added to the respective abovementioned CV measurements in the next step. LMO is destroyed by reaction with HF, with Mn being leached from the crystal composite. Here too, evaluation of the CV data (plotting of the peak heights) shows that the inorganic filler materials scavenge HF in the presence of an electrode material. After the CV measurement, the supernatant solution was analyzed for $Mn^{2+}$ by means of ICP-OES. It can be seen here that significantly less Mn has been leached from the cathode material in the case of the sample with material b compared to material a and the system without inorganic additive.

$Mn^{2+}$ content in mg/l in water-moistened electrolyte after 25 cycles (determined using ICP-OES)

| | |
|---|---|
| Electrolyte | 40 |
| Electrolyte + $Al_2O_3$ | 40 |
| Electrolyte + WE17 | 20 |

Furthermore, the getter action of the material b commences only after a particular time (in CV, further significant decrease in the HF peak after 5 cycles). This is necessary since small amounts of HF are required during activation of an LIB cell in order to form the SEI and also to passivate the Al current collector for the cathode.

For the calendar identification of HF scavenging, materials a and b were storaged in moistened electrolyte for 7 days and the fluoride content was subsequently determined by means of ion chromatography. Material b binds HF significantly during downtimes.

F content in mg/l (calendar effect) in electrolyte moistened with 1500 ppm of water after 7 days

| | | |
|---|---|---|
| Electrolyte | 1300 ± 130 | 87% (corresponds to 1300 ppm) 13% scavenged |
| Electrolyte + $Al_2O_3$ | 1500 ± 150 | 100% (corresponds to 1500 ppm) 0% scavenged |
| Electrolyte + WE17 | 900 ± 100 | 60% (corresponds to 900 ppm) 40% scavenged |

Example 3

When additional water is introduced into an LIB cell, materials a and b bind water from the system. This occurs both under potential load and also during downtimes.

The calendar effect was detected: an electrolyte composed of EC:DMC with 1 M $LiClO_4$ (suppression of reaction of the anion with water to form HF) and 1000 ppm of water is mixed with the inorganic materials a and b. After standing for 7 days, the residual amount of water is determined by means of Karl-Fischer titration. Both materials withdraw water from the electrolyte.

$H_2O$ content in mg/kg of solvent (calendar effect) in electrolyte moistened with 1500 ppm of water after 7 days

| | | |
|---|---|---|
| Electrolyte | 997 ± 10 | 100% (corresponds to 997 ppm) 0% scavenged |
| Electrolyte + $Al_2O_3$ | 917 ± 10 | 92% (corresponds to 917 ppm) 8% scavenged |
| Electrolyte + WE17 | 894 ± 10 | 89% (corresponds to 894 ppm) 11% scavenged |

Working example of an electrochemical energy storage containing as additive at least one silicon- and alkaline earth metal-containing compound V1 which in contact with a fluorine-containing compound in the energy storage forms at least one compound V3 which is a fluorine-containing, lithium-free alkaline earth metal compound V3b, in this case $BaF_2$.

A separator coated with the additive (glass powder) was installed in cathode half cells (Li/LP30/glass-polyethylene separator/LP30/cathode material; 1) lithium manganese oxide (LMO) 2) lithium nickel cobalt manganese oxide (NCM)) for a battery test. Swagelok cells were used together with a lithium reference for the experiment. Cycling was carried out according to a CC-CV method. At the beginning, 5 activation cycles are carried out at a current for C/10 (corresponds to one charging or discharging step of 10 h), and the cells are subsequently charged and discharged with a current of 1 C (corresponds to the time of 1 h). The voltage range was from 3.0 to −4.4 V. After 60 cycles, the cells were dissembled and the separator coating was examined by means of XRD. This shows that $BaF_2$ was formed. The electrolyte LP30 [EC:DMC (1:1)+1 mol/l of $LiPF_6$] was dry ($H_2O$<20 ppm).

The glass powder used had the following composition in mol %:

| | |
|---|---|
| $SiO_2$: | 47.5 |
| BaO: | 47.5 |
| $ZrO_2$: | 5 |

What is claimed is:

1. An electrochemical energy storage, comprising:
a liquid electrolyte; and
an additive in the liquid electrolyte, the additive containing at least one silicon- and alkaline earth metal-containing compound V1 which in contact with a fluorine-containing compound V2 in the energy storage forms at least one compound V3 selected from the group consisting of silicon- and fluorine-containing, lithium-free compounds V3a, alkaline earth metal- and fluorine-containing, lithium-free compounds V3b, silicon-, alkaline earth metal- and fluorine-containing, lithium-free compounds V3c and combinations thereof, wherein said at least one silicon- and alkaline earth metal-containing compound V1 is a powder comprising at least the following constituents (in % by weight):

| | |
|---|---|
| $SiO_2$ | 15-68 |
| BaO | 10-80 |
| $ZrO_2$ | 0-15 |
| $Li_2O$ | greater than 0-25 |
| $P_2O_5$ | greater than 0-20 |
| $Al_2O_3$ | greater than 0-1.1 |
| CaO | 0-30 |
| MgO | 0-30 |
| MgO + BaO + CaO | ≥20 |
| NiO | 0-10 |
| PbO | 0-10 |
| ZnO | 0-10 |
| F | 0-5, | a molar ratio of one or more alkaline earth metal oxides to silicon dioxide is in a range from 0.65 to ≤1.0, and wherein said at least one silicon- and alkaline earth metal-containing compound V1 does not contain any $B_2O_3$.

2. The energy storage of claim 1, wherein the liquid electrolyte is selected from the group consisting of a non-aqueous electrolyte, an electrolyte based on carbonate solvents, and an electrolyte containing at least $LiPF_6$.

3. The energy storage of claim 1, wherein said energy storage is a lithium ion cell.

4. The energy storage of claim 1, wherein the energy storage contains an anode, a cathode and a separator.

5. The energy storage of claim 1, wherein the molar ratio of one or more alkaline earth metal oxides to silicon dioxide is a molar ratio of $BaO/SiO_2$.

6. The electrochemical energy storage of claim 1, wherein the compound V1 comprises 60-80% by weight of BaO.

* * * * *